CONTROL SYSTEM FOR MAGNETIC RECORDER-REPRODUCER

Filed Jan. 31, 1958 4 Sheets-Sheet 1

Inventor.
Sheldon Lee Pastor.
By: Zabel, Baker, York, Jones & Dithmar
Attorneys.

June 28, 1960 S. L. PASTOR 2,942,875

CONTROL SYSTEM FOR MAGNETIC RECORDER-REPRODUCER

Filed Jan. 31, 1958 4 Sheets-Sheet 2

Inventor.
Sheldon Lee Pastor.

By- Zabel, Baker, York, Jones & Dithmar
Attorneys.

CONTROL SYSTEM FOR MAGNETIC RECORDER-REPRODUCER

Filed Jan. 31, 1958 4 Sheets-Sheet 3

Inventor:
Sheldon Lee Pastor

By: Zabel, Baker, York, Jones & Dithmar
Attorneys.

June 28, 1960 S. L. PASTOR 2,942,875

CONTROL SYSTEM FOR MAGNETIC RECORDER-REPRODUCER

Filed Jan. 31, 1958 4 Sheets-Sheet 4

Inventor.
Sheldon Lee Pastor.
By. Zabel, Baker, York, Jones & Dithmar
Attorneys.

2,942,875
Patented June 28, 1960

2,942,875

CONTROL SYSTEM FOR MAGNETIC RECORDER-REPRODUCER

Sheldon Lee Pastor, Chicago, Ill., assignor to Revere Camera Company, Chicago, Ill., a corporation of Delaware Filed Jan. 31, 1958, Ser. No. 712,440
8 Claims. (Cl. 271—2.3)

This invention relates to an improved control system for a magnetic recorder-reproducer, and more particularly to an improved control system of the keyboard type.

The control system of this invention constitutes an improvement over the solenoid-actuated keyboard control system disclosed in the co-pending application of Robert L. Moore and Sheldon Lee Pastor, Serial No. 293,814, filed June 16, 1952, now Patent No. 2,877,958, and the rotary type control system disclosed and claimed in U.S. Patent No. 2,785,892 issued March 19, 1957 to Sheldon Lee Pastor.

As is well known, a magnetic recorder-reproducer is an instrument capable of recording intelligence on a magnetic record medium, such as magnetic tape or wire, and of playing back such recorded intelligence, or other similarly recorded intelligence, through an audio or other system. Inasmuch as magnetic tape is the more commonly used record medium, the word "tape" will be used in the following description, although it will be understood that magnetic wire may be used in an instrument embodying the invention.

In an instrument of this character, tape from a supply reel travels across a sound head to a take-up reel. The sound head during the play function of the instrument derives intelligence from the traveling tape, and during the record function erases material previously on the tape, if any, and impresses the tape with new intelligence. To avoid distortions in the sound it is important that the tape have a constant speed as it travels across the sound head during the play and record functions. In most instruments of this character the tape is driven at constant speed by means of a capstan which rotates at uniform speed, the tape being pressed into driving engagement with the capstan by means of a biased pressure roller.

A magnetic recorder-reproducer includes a suitable electronic amplifier which is employed both for recording and playing. Certain switching in the amplifier is necessary to condition the amplifier for its respective record and play functions. The required switching usually occurs in response to the manual control which initiates tape travel for the desired function.

The present control system invention is shown embodied in an instrument of the aforesaid type. The illustrated instrument includes mechanism whereby the tape may be driven in forward direction at rapid speed and also mechanism whereby the tap may be driven in backward or reverse direction at rapid speed. The former function is for convenience in cueing the tape, and the latter function provides reduced time for rewinding the tape from the take-up reel to the supply reel.

One object of the invention is to provide a highly simplified control system for a magnetic recorder-reproducer which controls the aforesaid tape functions and performs the electrical switching necessary to condition the instrument for the various functions.

Another object of the invention is to provide a control system of the keyboard type wherein a minimum number of keys are employed to control the various functions of the instrument. In the form of the invention illustrated three main keys are provided, but it will be seen that most of the advantages of the invention may be obtained by the use of only two keys.

Still another object of the invention is to provide an improved key construction wherein the manual force required to depress the key is a minimum, and wherein energy for the key travel at the lowermost end of the key stroke is provided by the instrument itself, thereby creating an impression in the mind of the user that operation of the key is virtually effortless. This feature may be compared with prior keys wherein the pressure required to depress the key increases with the length of stroke and is a maximum at the lower end of the stroke.

Still another object of the invention is to provide a keyboard control system wherein the several keys are related by a series of interlocks which make it impossible to actuate the keys in damaging or even in improper sequence. Thus a user unacquainted with the instrument cannot cause damage, and such a user easily may operate the instrument successfully without first learning or even referring to operating instructions.

Another object of the invention is to provide a control system of the keyboard type wherein the keys are effective to perform most of the required electrical switching.

Another object contemplates that certain electrical switching will take place at times when tape travel has stopped, thereby eliminating the possibility that switching noise (transients) will be recorded on the tape or even amplified and communicated to a loudspeaker.

Another object is to provide a control system wherein the record key may not be depressed without an additional conscious act, that is, without actuating an interlock mechanism. The actuator for this interlock mechanism also is the actuator for instantly stopping tape travel, hereinafter called the "instant stop" mechanism. This feature, as mentioned above, cooperates to prevent switching noise from being recorded on the tape. It also enables the user to adjust the recording level control before tape travel commences at the start of the record function.

Still another object of the invention is to provide a control system wherein the amplifier switching required in shifting from record condition to play condition goes through an intermediate or "off" position so that the recording head can be demagnitized in accordance with the invention disclosed and claimed in U.S. Patent No. 2,682,578 to Carl W. Claras.

Still another object of the invention is to provide a keyboard control system wherein any key when depressed will release any previously depressed key and restore the latter to "up" position.

Another object is to provide a keyboard control system wherein the respective keys cooperate with a separate control which initiates and terminates rapid tape drive. Actuation of such separate control first releases any depressed key and thereby terminates slow speed drive before being effective to produce rapid drive. Conversely, when the tape is in a rapid drive, the slow speed play and record keys cannot be depressed.

Another object is to provide a simple and effective interlock whereby the act of turning off the amplifier power switch will release any depressed key and thereby separate the biased pressure roller from the drive capstan. This avoids harmful deformation of the pressure roller.

Other objects, advantages and details of the invention will be apparent as the description proceeds, reference being had to the accompanying drawings wherein one embodiment of the invention is shown. It is to be understood that the description and drawings are illustrative only and that the scope of the invention is to be measured by the appended claims.

Figure 1:
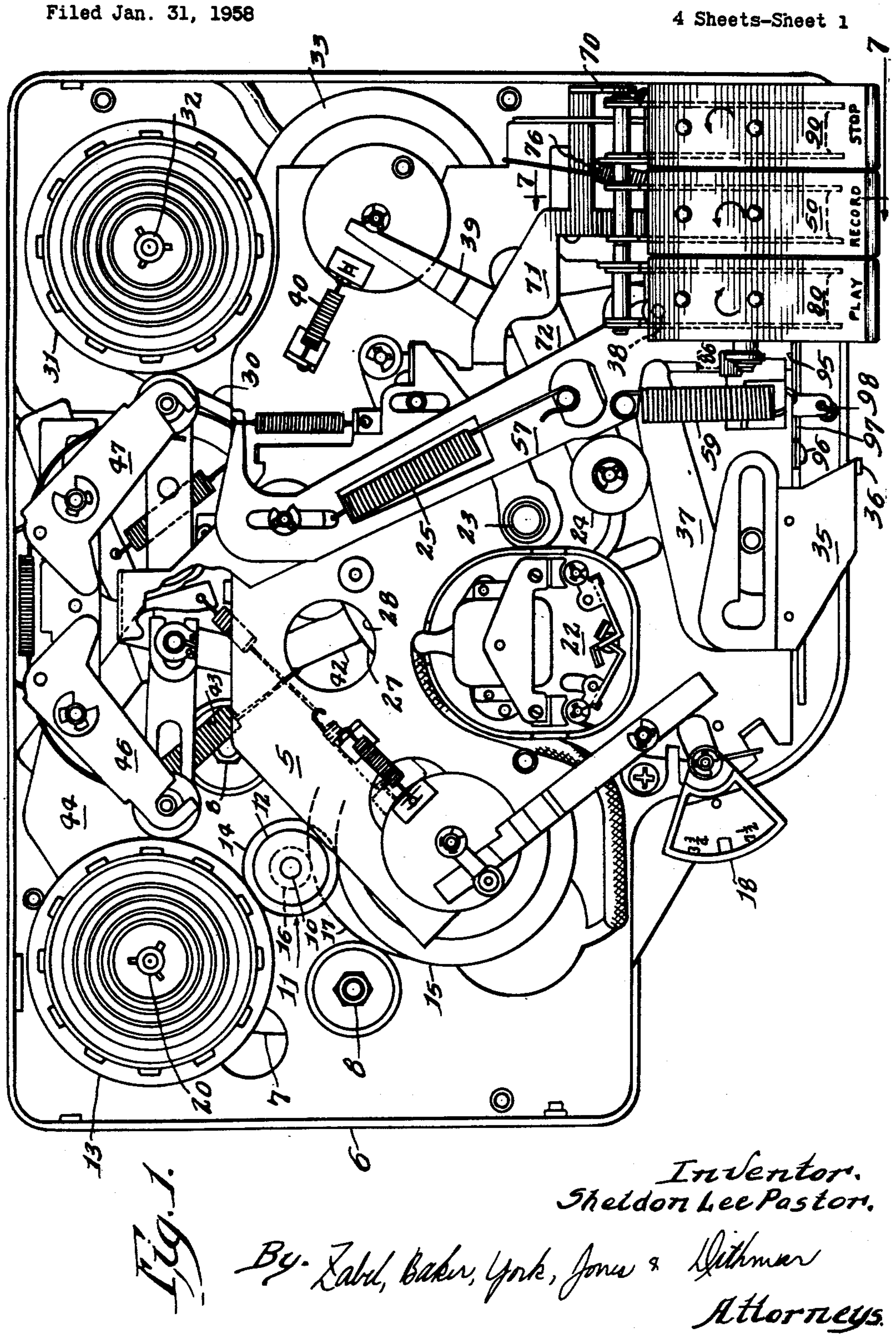
Fig. 1 is a plan view of a magnetic recorder-reproducer embodying the invention, the cover plate of the instrument and certain other external parts as well as the amplifier being omitted for purposes of illustration.

Before referring to the drawings in detail, it should be mentioned that the control system of the invention is best shown in detail for the most part in Figs. 5–9. The subject matter of Figs. 1–4, apart from the control system, in many respects is common to subject matter illustrated and described in aforesaid co-pending application Serial No. 293,814 and aforesaid U.S. Patent No. 2,785,892. Only so much of such common subject matter will be described here in detail as is necessary for an understanding of the present control system.

Referring first to Figs. 1–4, the illustrated instrument has a mounting means or plate 5 which is suitably supported in spaced relation above a lower mounting plate 6. The latter plate 6 is substantially co-extensive with the portion of the instrument shown in Fig. 1.

Figures 2, 9:
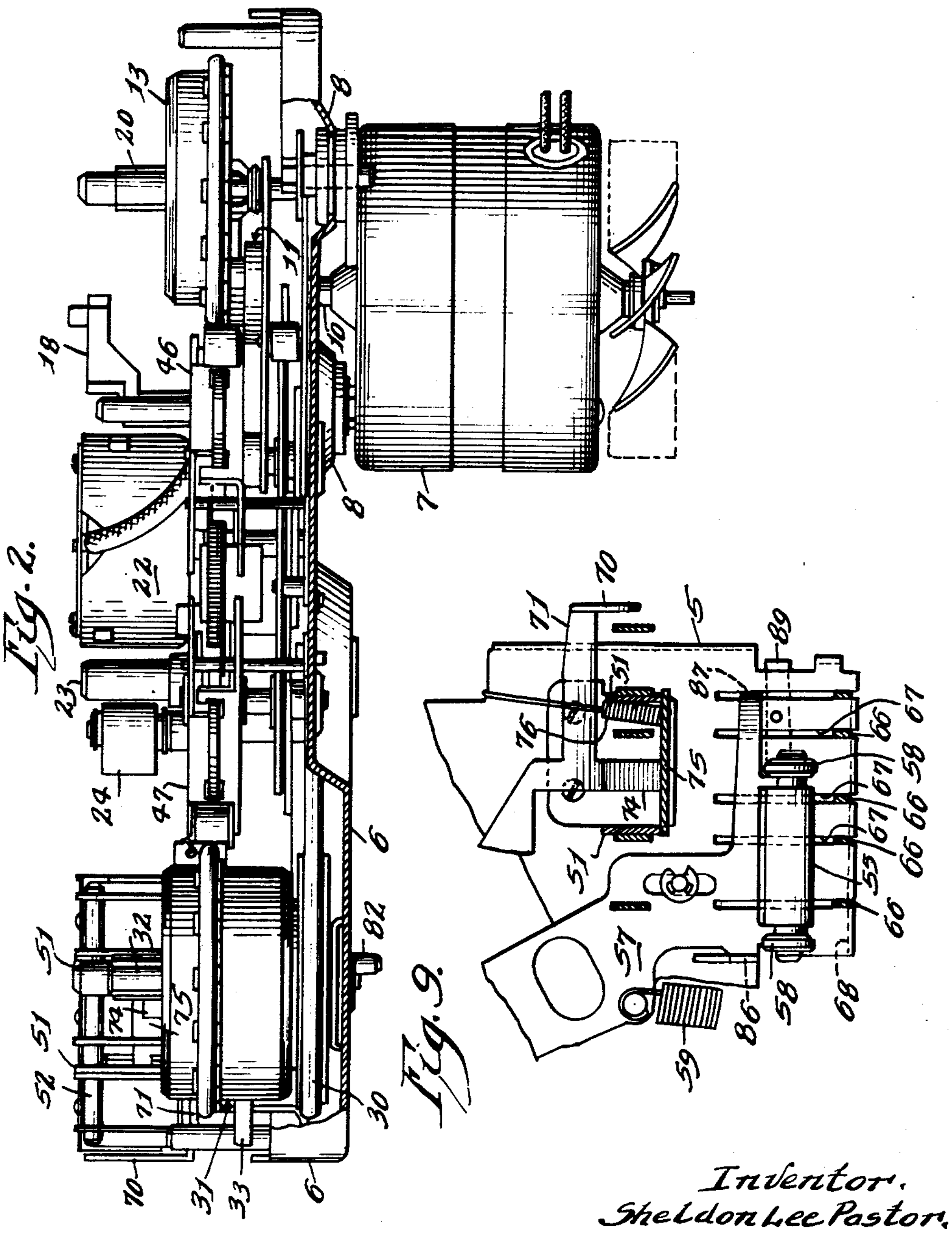
Fig. 2 is a rear elevational view, partly in section, of the instrument shown in Fig. 1.
Fig. 9 is a sectional view on irregular line 9—9 of Fig. 7.
Figure 3:
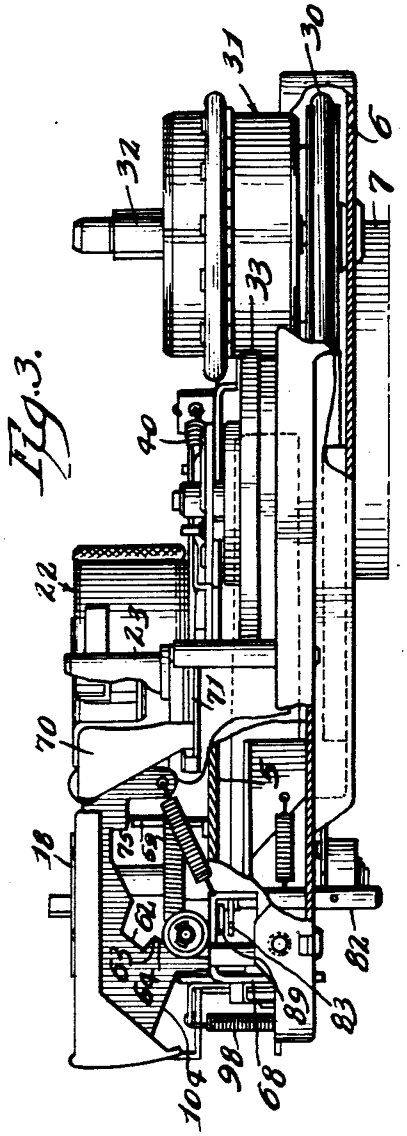
Fig. 3 is a side elevational view, partly in section, of the instrument shown in Fig. 1.

A motor 7, best shown in Fig. 2, is resiliently supported by and below lower mounting plate 6. The motor mounting means are designated 8 in the several views.

A motor shaft 10, best shown in Fig. 2, projects above lower mounting plate 6 and carries at its upper end a motor roller 11. Motor roller 11 has three peripheral portions of different diameters, best shown in Fig. 4. Upper portion 12 is engaged by a supply reel roller 13 when the latter is shifted to position for rapid rewind drive. Intermediate portion 14 engages an idler roller 15 when tape travel at 7½ inches per second is desired and lower peripheral portion 16 is engaged by a second idler roller 17 when tape travel at 3¾ inches per second is desired.

Control 18 (lower left in Fig. 1) determines which of the two idler rollers 15 or 17 engages its respective periphery of motor roller 11. Idler rollers 15 and 17 each have a shiftable axis which is moved in response to control 18.

A spindle 20, associated with supply reel roller 13, receives a supply reel of tape (not shown).

Tape from the supply reel is driven across a record-reproduce sound head 22 by means of a capstan 23, the tape passing between capstan 23 and an idler pressure roller 24 which is biased against the tape and capstan by means of a spring 25 (Fig. 1) when the control system has conditioned the instrument for the play or record functions.

Capstan 23 is the upper end of the axle of a flywheel 27, an edge of which is shown through circular opening 28 in the center of Fig. 1. The periphery of flywheel 27 engages the periphery of one or the other of the idler rollers 15 or 17, depending on which one is rendered operative by control 18. Thus, flywheel 27 is driven by motor roller 11 through idler roller 15 or 17, and the flywheel rotates at the uniform rate necessary for proper tape travel during the play or record functions.

A belt 30 extends between the axle of flywheel 27 and a take-up reel roller assembly 31. The latter includes a spindle 32 for a take-up reel (not shown) and a friction clutch mechanism (not shown) between spindle 32 and the portion driven by belt 30.

An idler roller 33 is mounted on plate 5 for sliding movement toward and away from engagement between the periphery of flywheel 27 and take-up reel roller assembly 31. During most functions, idler roller 33 is out of engagement with the flywheel and assembly. Engagement occurs only during rapid forward travel of the tape.

Rapid travel of the tape is controlled by a plate 35 (bottom of Fig. 1) which is moved to the right (for rapid forward) and to the left (for rapid rewind) by means of a knob (not shown) carried at the top of upstanding arm 36.

For rapid forward, plate 35 is moved to the right (the direction of desired tape travel) and biased cam lever 37, pivoted at 38, rotates in counterclockwise direction. Arm 39 of lever 37 moves away from the axis of idler roller 33 and permits a bias spring 40 to move idler roller 33 into engagement both with the periphery of flywheel 27 and take-up reel roller assembly 31. In this circumstance assembly 31 is driven by flywheel 27 in counterclockwise direction at rapid speed.

For rapid rewind, plate 35 is moved to the left (direction of desired tape travel). Pivoted lever 42, a portion of which is shown in the center of Fig. 1, rotates in clockwise direction and permits a bias spring 43 to move pivoted plate 44 in counterclockwise direction. This causes supply reel roller 13, which is mounted on plate 44, to swing into engagement with upper portion 12 of motor roller 11. The latter drives supply reel roller 13 in clockwise direction at rapid speed for rewind.

Proper tape handling and control during slow forward drive for play and record, rapid forward and rapid rewind drive are aided by brake assemblies 46 and 47, the actions of which are synchronized with the controls for the various tape travel functions. These brake assemblies are more fully described and claimed in the aforesaid co-pending application, Serial No. 293,814, and illustrated and described in aforesaid U.S. Patent No. 2,785,892.

The present invention, as previously mentioned, concerns itself with an improved control system for a magnetic recorder-reproducer of the above described general type. The control system involves one or more keys, and in its broadest aspect, the invention resides in the construction and operation of one of these keys. Other aspects of the invention deal with the construction and operation of two or more keys used to control the several functions of a recorder-reproducer and with other features which cooperate with the keys in providing simplified and foolproof operation of the instrument.

Figures 4, 7, 8:
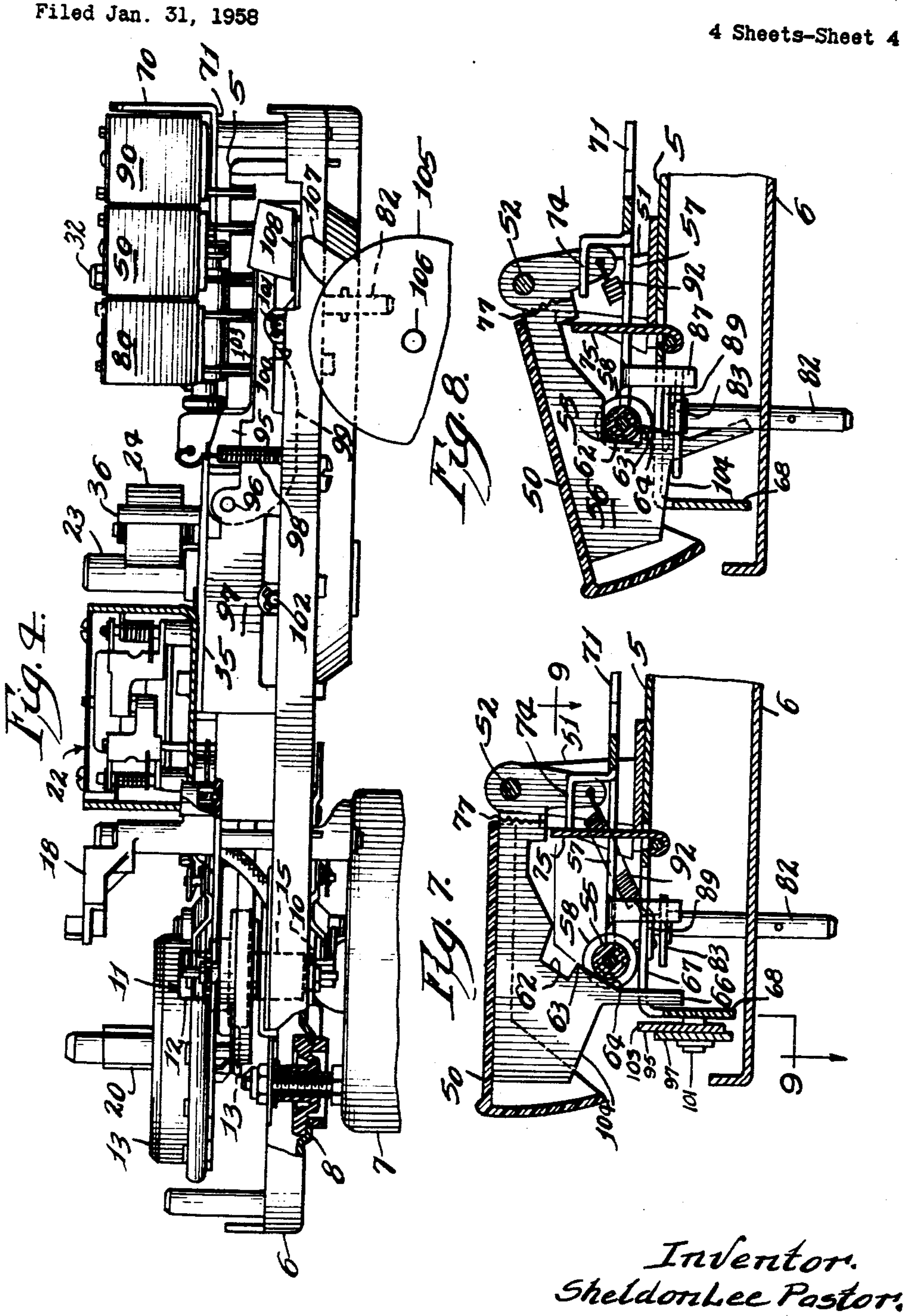
Fig. 4 is a front elevational view, partly broken away, of the instrument shown in Fig. 1.
Fig. 7 is an enlarged sectional view on line 7—7 of Fig. 1.
Fig. 8 is a view similar to Fig. 7 but illustrating the key in depressed position.

Referring first to Figs. 7, 8 and 9, the construction and operation of one of these keys first will be described. The key illustrated in Figs. 7 and 8 is a typical key and it is there shown in its two alternative positions.

Referring to Figs. 7, 8 and 9, mounting means or plate 5 has a support means such as upstanding bracket 51 which carries a transverse pin 52. Key 50 is pivoted at its rear end on pin 52.

Key 50 and mounting plate 5 also are related functionally by a cam roller means 55 and a cam means generally designated 56. As here shown, cam roller means 55 is carried by mounting plate 5 and cam means 56 is carried by key 50, but these parts, if desired, may be carried in reverse manner.

Cam roller means 55 is mounted at the forward end of a movable plate 57, and at each end of the roller means is a disk 58 which rolls on the top of mounting means 5, thereby supporting roller means 55 slightly above the latter. Plate 57 is mounted for guided forward and rearward movement with respect to mounting means 5, and a spring 59 (Figs. 1 and 9) biases the plate in forward direction.

Cam means 56 faces cam roller means 55 and, as here shown, it faces in rearward direction. Cam means 56 has a cam recess portion 62, a cam nose portion 63 and an inclined portion 64. During key operation, up or down, cam roller means 55 and cam means 56 have relative motion, as will be seen.

As shown in Fig. 7, when key 50 is in "up" position, forwardly biased cam roller means 55 engages inclined portion 64 of cam means 56. This relationship holds key 50 in "up" position, the upper limit being determined by a finger 66 extending downwardly from cam means 56 through a slot 67 in mounting means 5. Finger 66 engages flange 68 at the forward edge of mounting means 5 to limit the "up" position of key 50.

As key 50 is depressed, cam roller means 55 rides up inclined portion 64 of cam means 56 and rides over cam nose portion 63 and into cam recess portion 62. The tension of spring 59 which biases cam roller means 55 forwardly and the inclination of inclined cam portion 64 are so chosen that relatively little manual effort is required to depress key 50 to the point where cam roller means 55 rides over cam nose portion 63. When cam roller means 55 passes nose portion 63 the former is in position to enter cam recess portion 62.

The forward bias provided by spring 59 and pressure roller spring 25 is effective at this point in the key travel to "take over" and complete the act of depressing key 50, as will be understood from the relationship between cam roller means 55 and the lower edge of cam recess portion 62. This gives rise to a distinct impression on the part of the user that substantially no manual force is required to depress the key, i.e., that key operation is substantially effortless.

The foregoing action may be compared with that of conventional control keys wherein the required manual pressure increases to a maximum at the lower limit of key travel. With the present key only minor manual force is required in the upper portion of key travel and no manual force is required in the lower portion of key travel.

Cam recess portion 62 constitutes a detent which receives cam roller means 55, and the relationship thus provided holds the key in depressed position, as illustrated in Fig. 8.

At this point another feature of the invention will be described with reference to Figs. 7–9. Experience has demonstrated that the record control on a magnetic recorder-reproducer desirably should have an interlock which prevents actuation of the control in the absence of an additional conscious act on the part of the user. This is to prevent accidental erasure by thoughtless actuation of the record control.

The interlock feature in the present invention is coordinated with and actuated by a control which also effects instant stop of the tape travel. This combined interlock and instant stop control is provided by a manual means such as an upstanding arm 70 (Fig. 9) of a plate 71 which is pivoted about capstan 23 (Fig. 1). When upstanding arm 70 is moved forward manually, a related element (not shown) moves a pivoted member 72, which carries idler pressure roller 24, in counterclockwise direction, thereby effecting separation between capstan 23 and pressure roller 24. This breaks the capstan drive and stops the tape instantly.

Referring again to Figs. 7–9, plate 71 has a forwardly extending finger 74 which in Fig. 7 engages a vertical plate 75 which is pivoted to mounting means 5. Pivoted plate 75 is biased rearwardly to vertical position by means of a spring 76 (Fig. 9). As shown in Fig. 7, the upper edge of plate 75 opposes portion 77 of key 50, and thus key 50 may not be depressed so long as plate 75 and portion 77 have the relationship shown in Fig. 7. Forward movement of arm 70, however, causes finger 74 of plate 71 to move pivoted plate 75 forwardly and out of the way of portion 77. When this is done, record key 50 may be depressed as shown in Fig. 8. When record key 50 is elevated, bias spring 76 returns plate 75 to vertical interlock position.

Having thus described a typical control key of the invention, as exemplified by record key 50, the remaining key or keys and the relationship between them and their control elements of the recorder-reproducer now will be described.

Figure 5:
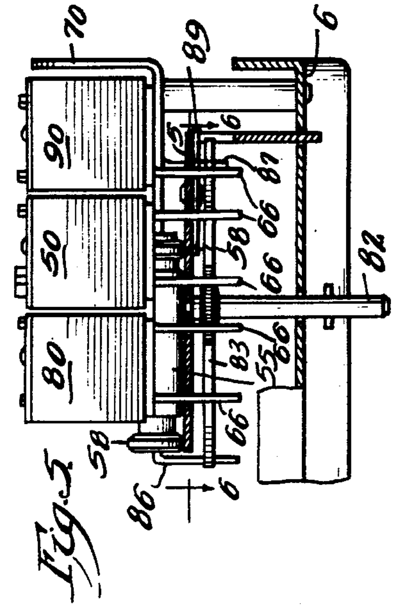
Fig. 5 is an enlarged fragmentary front elevational view, partly broken away, of the right hand portion of Fig. 4.

The second key in the present control system is play key 80 (Figs. 1, 4 and 5). Play key 80 is similar to record key 50 in structure (including cam means 56) and mounting, and it has the same relationship with cam rolled means 55. Both keys, as illustrated, have two depending fingers 66 extending through registering slots 67 in mounting means 5. Strictly speaking, each key requires only one depending finger 66 and one associated cam means 56, but for manufacturing convenience and operational simplicity each illustrated key has two fingers and two cam means. Both keys, when depressed, initiate forward tape drive at slow speed and, when elevated, terminate forward tape drive at slow speed.

Figure 6:
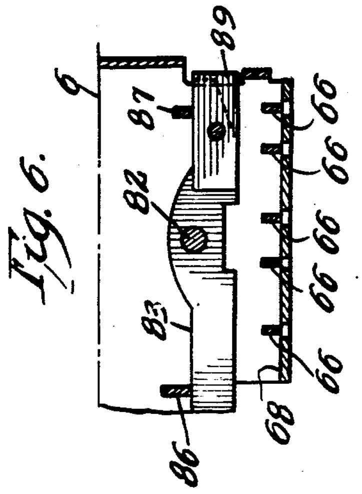
Fig. 6 is a fragmentary view on line 6—6 of Fig. 5.

Referring to Figs. 5 and 6, a vertical function switch shaft 82 is mounted for rotation below and between record key 50 and play key 80. As shown, the upper end of shaft 82 is journalled in mounting means 5. Lateral means in the form of a horizontal bar 83 is carried rigidly by shaft 82 just below mounting means 5. As will be understood, rotation of shaft 82 in one direction or the other effects switching of the amplifier to condition same respectively for the record and play functions.

Referring to Fig. 6, the left hand key finger 66 extends downwardly from play key 80. When play key 80 is depressed, said finger 66 moves rearwardly into engagement with bar 83 and effects clockwise rotation of switch shaft 82 to switch the amplifier to play condition. Also, when play key 80 is depressed the relationship between cam means 56 of the key and cam roller means 55 is such that plate 57 which carries cam roller means 55 is moved rearwardly. The rearward movement of this plate 57 permits idler pressure roller 24 to engage capstan 23 to initiate tape travel at proper speed for play (3¾ or 7½ inches per second). As seen in Fig. 1, when plate 57 moves rearwardly stud 85 on pivoted arm 72 moves with it under influence of bias spring 25, thereby rotating arm 72 and bringing pressure roller 24 into engagement with capstan 23. Plate 57 moves somewhat farther than stud 85 so spring 25 is enabled to apply proper bias between the pressure roller and capstan as well as aid in biasing plate 57 forwardly.

Depressed play key 80 (as well as depressed record key 50) may be lifted manually, if desired, in which case cam roller means 55 will move forwardly under bias of spring 59 to the position shown in Fig. 7. This, of course, means that plate 57 moves forwardly, and in so doing, stud 85 is engaged thereby to effect separation between pressure roller 24 and capstan 23 and thus stop tape travel.

It is desirable that this action should be followed by a switching of the amplifier, which requires rotation of switch shaft 82. This is accomplished by means of a depending finger 86, best shown in Figs. 5 and 6, which extends downwardly from plate 57 into position to engage bar 83. With this arrangement, when plate 57 moves forwardly, as it does when play key 80 is elevated, depending finger 86 likewise moves forwardly to engage bar 83 and rotation the bar in counterclockwise direction to the central position shown in Fig. 6.

Plate 57 has a second depending finger 87 which also extends downwardly in effective relation with bar 83, the location of finger 87 being adjacent the end of bar 83 opposite finger 86. When bar 83 occupies its counterclockwise position to condition the amplifier for recording, as it does when record key 50 is depressed, finger 87 is effective to return bar 83 to the central position shown in Fig. 6 when record key 50 is elevated and plate 57 moves forwardly.

When record key 50 is depressed manually as more fully described above, the right hand finger 66 thereof (Figs. 5 and 6) engages bar 83 and moves the bar and associated switch shaft 82 in counterclockwise direction to condition the amplifier for the record function. If play key 80 happens to be depressed at the time record key 50 is pushed down, play key 80 will be elevated due to the engagement between its finger 66 and bar 83 which is moved in counterclockwise direction by the act of depressing record key 50. Similarly, if record key 50 is in depressed position when play key 80 is pushed down, the consequent rotation of bar 83 will elevate record key 50. This relationship between the play and record keys is such that it is impossible to depress both keys simultaneously, and such that lowering of one key elevates the other if the latter be "down."

Still referring to Figs. 5 and 6, an auxiliary lever 89 is pivoted on mounting means 5 below and between record key 50 and a stop key 90. Auxiliary lever 89 cooperates with stop key 90 and record key 50, as will be seen, so that record key 50, if depressed, will be elevated when stop key 90 is depressed.

Stop key 90 may be similar in construction to the other keys although it does not need to have a cam means for the reason that there is no engagement between the key and cam roller means 55. Also, stop key 90 requires only one depending finger 66, and only one such finger is shown in Figs. 5 and 6.

Depending finger 66 of stop key 90 is adjacent one end of lever 89 when said lever is in clockwise position due to depression of record key 50. Subsequent depression of stop key 90 brings its finger 66 into engagement with auxiliary lever 89 and turns the latter in counterclockwise direction. Such movement brings the opposite end of auxiliary lever 89 into engagement with finger 66 of record key 50, thereby elevating record key 50 in response to the act of depressing stop key 90.

Stop key 90 is effective, when pushed down, to elevate play key 80 if the latter is in depressed position. Finger 66 of stop key 90 rotates bar 83 of switch shaft 82 in counterclockwise direction to effect this result. Since stop key 90 never needs to be held in depressed position, no means are provided to so hold the key, and the key is biased to "up" position by means of a spring 92 which is shown in phantom in Figs. 7 and 8. It will be understood that the spring 92 shown in Figs. 7 and 8 is not connected to key 50, but rather is connected to stop key 90 to maintain stop key 90 in elevated position and to give it a resistance to depression which is comparable to that of the other two keys.

From the foregoing description of keys 50, 80 and 90, it will be seen that when play key 80 is in depressed position, depression of either of the other two keys is effective to elevate key 80. Similarly, when record key 50 is depressed, depression of either of the other two keys is effective to elevate key 50. Also, depression of either play key 80 or record key 50 is effective to initiate tape travel at the proper speed (3¾ or 7½ inches per second) for the play or record functions. Conversely, when either of these keys is elevated, tape travel stops instantly.

As previously mentioned, when both play and record keys 80 and 50 are in "up" position, bar 83 on switch shaft 82 has a central position, the position shown in Fig. 6. This central position may be termed an "off" position so far as concerns switching the amplifier for the record or play functions. The switch when in "off" position permits the recording head to be demagnitized, as more fully explained in U.S. Patent No. 2,682,578 to Carl W. Claras. This demagnitization is important when the amplifier is being switched from the record to the play condition so as to prevent "noise" due to residual magnetization of the sound head from being recorded on the tape during the play function.

As previously mentioned, the rapid tape drive functions are controlled by plate 35 (Fig. 1) which is moved from a central neutral position to the right for rapid forward drive and to the left for rapid rewind drive. An interlock arrangement is provided whereby actuation of rapid drive plate 35 elevates any depressed key and stops tape travel at the slow speed before establishing the drive for rapid speed.

This interlock arrangement comprises a cam arm 95 pivoted at 96 to a sliding bar 97 secured to plate 35. This arrangement is best shown in Fig. 4 and it will be noted that pivoted arm 95 is biased downwardly by spring 98. The lower edge 99 of cam arm 95 has an inverted V-shaped cam recess 100 which moves back and forth with respect to a guide pin 101 for sliding plate 97. A spaced guide pin 102 cooperates with pin 101 for properly guiding plate 97.

Still referring to Fig. 4, the rapid speed parts are illustrated in central or neutral position with the deep portion of cam recess 100 engaging pin 101. When in this neutral position there is no rapid drive in either direction. Also, pivoted cam arm 95 is in lowermost position so the upper edge 103 of this arm below the keys does not interfere with downward movement of the keys.

However, when the rapid speed elements are moved either to the right or left, pivoted cam arm 95 rides up on pin 101, thereby bringing upper edge 103 of this arm in close proximity to portions 104 (Figs. 7 and 8) of the keys. Thus when cam arm 95 is elevated as it is in either rapid forward or rapid rewind function, upper edge 103 of arm 95 is effective to prevent movement of play key 80 or record key 50 to "down" position. This, of course, is necessary to avoid the possibility that a slow speed drive for play or record will be established during operation of a rapid speed drive.

It might be noted that when the rapid speed elements are moved to the left there is nothing to prevent the depression of stop key 90. This is of no consequence inasmuch as the only function performed by stop key 90 is to elevate either of the other keys which may be "down." Since both of the other keys are in "up" position during rapid speed drive, no function is performed by depressing stop key 90.

Pivoted cam arm 95 has another important purpose in addition to the function of preventing the depression of keys 80 and 50 during rapid tape drive. This other purpose, previously mentioned, is to elevate a depressed play or record key in response to actuation of rapid speed control 36 before rapid speed drive is actually established. This, of course, is to terminate slow speed drive before the commencement of rapid drive.

With either key 50 or 80 in depressed position, actuation of rapid speed control 36 in either direction causes movement of sliding plate 97 and corresponding relative movement between lower edge 99 of pivoted cam plate 95 and pin 101. This movement elevates pivoted plate 95 so its upper edge 103 will engage key portion 104 and elevate the depressed key. Thus, slow speed drive for the record or play functions is interrupted before initiation of rapid speed drive.

A final yet important feature of the invention is illustrated only in Fig. 4. Parts thereof are omitted in the various other figures for clarity.

Referring to Fig. 4, a knob 105, shown broken away at the right, is mounted on a shaft 106. The latter actuates the amplifier power switch for a few degrees of rotation and the amplifier tone control adjustment during its remaining degrees of rotation.

Knob 105 has means such as a cam portion or projection 107 in effective relation with a horizontal plate 108 which is connected to pivoted cam arm 95. The position of knob 105 and projection 107 shown in Fig. 4 is the position occupied when the power switch is in "on"

position. When the power switch is "off," knob 105 and projection 107 occupy a position a few degrees away in counterclockwise direction.

When the power switch is turned "off" by manually rotating knob 105 in counterclockwise direction, projection 107 elevates horizontal plate 108 and associated pivoted cam lever 95. Thus, if either play key 80 or record key 50 is in "down" position when the amplifier power is turned off, upper edge 103 of cam lever 95 is effective to elevate the down key. This feature makes it impossible to turn the amplifier off without at the same time disengaging pressure roller 24 from capstan 23, it being remembered that the act of elevating either one of the play or record keys is effective to stop slow speed drive by separating pressure roller 24 from capstan 23. Absent such separation, flat spots develop on pressure roller 24 which adversely affect uniformity of tape drive and thus introduce distortions in recording and playing.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A control system for a magnetic recorder-reproducer having a mounting plate, said control system including a support means on said mounting plate, a play key and a record key each pivoted at its rear end to said support means, each key having a depending finger extending through an opening in said mounting plate, said play and record keys each having a downwardly extending cam portion facing rearwardly of the respective keys, each cam portion having a downwardly and forwardly inclined lower part and an upper part including a forwardly extending cam recess, with a cam nose between said parts, a movable cam roller means on said mounting plate, means biasing said cam roller means forwardly into engagement with said cam portions, said cam roller means having a pair of spaced projections each extending downwardly through an opening in said mounting plate, and a vertical function switch shaft rotatably carried by said mounting plate and aligned between said play and record keys, said switch shaft having a horizontal bar engageable by said play and record key fingers to rotate said shaft as each key is depressed and by the projections of said cam roller means to center said shaft when said cam roller means travels to forward position, said cam roller means entering a cam recess of a depressed key to hold said key in down position.

2. A control system for a magnetic recorder-reproducer having a mounting plate, said control system including a play key and a record key each carried by said mounting plate, each key having a depending finger extending below said mounting plate and a downwardly extending cam means facing rearwardly of the keys, each cam means having an upper recess, a middle cam nose and a lower part inclined downwardly and forwardly, a movable cam roller means on said mounting plate, means biasing said cam roller means into engagement with said cam means, said cam roller means having a pair of spaced projections extending below said mounting plate, and a vertical function switch shaft rotatably mounted below and aligned between said play and record keys, said switch shaft having lateral means engageable both by said play and record key fingers to rotate said shaft as each key is depressed and by the projections of said cam roller means to center said shaft when said cam roller means travels to forward position, said cam roller means entering the upper recess of a depressed key to hold said key in down position.

3. The combination of claim 2 with the addition of an interlock means biased to a position in which said interlock means prevents said record key from being depressed, and manual means changing the position of said interlock means whereby said record key may be depressed following actuation of said manual means.

4. The combination of claim 2 with the addition of a stop key carried by said mounting plate adjacent said record key, said stop key having a depending finger engageable with the lateral means of said switch shaft whereby when said stop key is depressed, the finger thereof engages and rotates said lateral means, rotation of said lateral means by said finger serving to unlatch said play key when in depressed position and elevate said play key, and means to elevate said stop key.

5. The combination of claim 4 with the addition of pivoted means on said mounting plate between said record and stop keys and engageable by the fingers of said record and stop keys whereby when said stop key is depressed, the finger thereof engages one end of said pivoted means and rotates the other end of said pivoted means into releasing and elevating engagement with the finger of said record key when said record key is in depressed position.

6. In a magnetic recorder-reproducer having a rotating capstan and cooperating biased pressure roller for driving tape in play and record, and a movable support for said pressure roller whereby said roller is disengageable from said capstan to stop tape travel instantly, the combination therewith of a control system including a depressible record key and a manually operable interlock means in effective relation with said record key whereby actuation of said interlock means is necessary before said record key can be depressed, and means connecting said interlock means with said movable support whereby actuation of said interlock means to permit depression of said record key is effective to separate said pressure roller from said capstan and thereby stop tape travel instantly, if the tape is moving, and maintain the tape stationary until release of said interlock means.

7. In a magnetic recorder-reproducer having control means establishing rapid tape drive alternatively in forward and rewind directions, said control means including a sliding plate, the combination therewith of a control system including depressible play and record keys mounted in effective relation with said sliding plate, a cam arm pivoted to said sliding plate and extending beneath said play and record keys, fixed means engaging said cam arm and cooperating therewith to position said arm in spaced relation to a depressed play or record key when said sliding plate is in neutral position and to position said arm in engaging relation with a depressed play or record key when said sliding plate is in rapid forward and rapid rewind position whereby such engaging relation is effective to elevate said play and record keys when either is in depressed condition.

8. The combination of claim 7 with the addition of a power switch control having a cam portion engageable with said pivoted cam arm when said switch control is moved to off position to move said cam arm into engaging and elevating relation with said play and record keys when either is in depressed condition.

References Cited in the file of this patent

UNITED STATES PATENTS

| | | |
|---|---|---|
| 2,063,372 | Eibert | Dec. 8, 1936 |
| 2,446,789 | Schmid | Aug. 10, 1948 |
| 2,648,234 | Lester | Aug. 11, 1953 |
| 2,726,720 | Martin | Dec. 13, 1955 |
| 2,785,892 | Pastor | Mar. 19, 1957 |
| 2,838,305 | Hoehn et al. | June 10, 1958 |

FOREIGN PATENTS

| | | |
|---|---|---|
| 470,370 | Canada | Dec. 26, 1950 |